(12) United States Patent
Borrelli et al.

(10) Patent No.: US 6,844,277 B2
(45) Date of Patent: Jan. 18, 2005

(54) UV PHOTOSENSITIVE MELTED GLASSES

(75) Inventors: Nicholas F. Borrelli, Elmira, NY (US); George B. Hares, Corning, NY (US); Charlene M. Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 312 days.

(21) Appl. No.: 10/099,088

(22) Filed: Mar. 15, 2002

(65) Prior Publication Data

US 2002/0123419 A1 Sep. 5, 2002

Related U.S. Application Data

(63) Continuation-in-part of application No. 09/874,342, filed on Jun. 5, 2001, now Pat. No. 6,632,759.
(60) Provisional application No. 60/221,811, filed on Jul. 31, 2000.

(51) Int. Cl.$^7$ .............................. C03C 4/00; C03C 3/06; C03C 3/091
(52) U.S. Cl. .............................. 501/13; 501/54; 501/66
(58) Field of Search ...................................... 501/11–79

(56) References Cited

U.S. PATENT DOCUMENTS

| | | | | |
|---|---|---|---|---|
| 6,143,676 A | * | 11/2000 | Ohashi et al. ................ | 501/54 |
| 6,333,283 B1 | * | 12/2001 | Urano et al. .................. | 501/54 |
| 6,451,719 B1 | * | 9/2002 | Yamagata .................... | 501/54 |
| 6,632,759 B2 | * | 10/2003 | Borelli et al. ................ | 501/66 |
| 2002/0123419 A1 | * | 9/2002 | Borrelli et al. ................ | 501/66 |
| 2003/0029203 A1 | * | 2/2003 | Borrelli et al. ................ | 65/404 |
| 2003/0174424 A1 | * | 9/2003 | Hart et al. ................... | 359/889 |
| 2003/0175007 A1 | * | 9/2003 | Wildeman et al. .......... | 385/147 |
| 2003/0179788 A1 | * | 9/2003 | Wildeman et al. ............ | 372/20 |

FOREIGN PATENT DOCUMENTS

WO   WO 9852879 A1 * 11/1998   ........... C03B/19/14

OTHER PUBLICATIONS

Doremus, Robert H., "Glass Science", 1994, John Wiley & Sons, Inc., Second Edition, pp. 18–19.*

* cited by examiner

*Primary Examiner*—Karl Group
*Assistant Examiner*—Elizabeth A. Bolden
(74) *Attorney, Agent, or Firm*—Timothy M. Schaeberle; Jim Suggs (57) ABSTRACT

The present invention relates generally to UV (ultraviolet) photosensitive bulk glass, and particularly to batch meltable alkali boro-alumino-silicate glasses. The photosensitive bulk glass of the invention exhibits photosensitivity to UV wavelengths below 300 nm.

The photosensitivity of the alkali boro-alumino-silicate bulk glass to UV wavelengths below 300 nm provide for the making of refractive index patterns in the glass. With a radiation source below 300 nm, such a laser, refractive index patterns are formed in the glass. The inventive photosensitive optical refractive index pattern forming bulk glass allows for the formation of patterns in glass and devices which utilize such patterned glass.

58 Claims, 11 Drawing Sheets

Glass Composition Table

| MOLE % | 1 | 2 | 3 | 4b | 5g | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 62.5 | 57.5 | 47.5 | 43.4 | 51.6 | 56.6 | 54.1 | 62.8 | 61.6 | 54.0 | 56.6 | 56.6 | 54.0 | 51 | 66.2 | 75.7 | 78.5 |
| $GeO_2$ | 2.5 | 2.5 | 2.5 | 15.0 | 7.5 | 2.5 | 5 | 2.5 | 7.5 | 2.5 | 2.5 | 2.5 | 2.5 | 7.5 | 5 | 5 | 5 |
| $LiO_2$ | | | | | | | | | | | | | 5.2 | 3.2 | 17 | .1 | |
| $Na_2O$ | 2.5 | 5 | 10 | 3.20 | 2.6 | 2.6 | 2.6 | 2.6 | 2.6 | 2.6 | | | | | .5 | 4.8 | 4.0 |
| $K_2O$ | | | | | | | | | | | 2.6 | | | | | | |
| $Al_2O_3$ | 2.5 | 5 | 10 | 3.20 | 3.20 | 3.20 | 3.2 | 3.2 | 3.2 | 3.2 | 3.2 | 3.2 | 3.2 | 3.2 | 2.1 | 1.2 | 1.4 |
| $B_2O_3$ | 30 | 30 | 30 | 35.1 | 35.1 | 35.1 | 35.1 | 25.1 | 25.1 | 35.1 | 35.1 | 35.1 | 35.1 | 35 | 17.5 | 13.2 | 11.1 |
| $H_2$ (×$10^{19}$) | 5 | 3.7 | 0.26 | 5 | 5 | 0.5 | 1 | 1.1 | 2 | 2.1 | 1.6 | 0.73 | 0.3 | | 2.5 | 2.5 | 2.5 |
| $\Delta_n$ (mod., ×$10^{-4}$) | 2.8 | 1.3 | 0.15 | 2.1 | 1.2-2.2 | | | | | | | | 0.3 | 1.3 | 0.3 | 0.2 | 0.1 |

US 6,844,277 B2

UV PHOTOSENSITIVE MELTED GLASSES

CROSS-REFERENCE TO RELATED PATENT APPLICATIONS

The present application is a continuation-in-part of U.S. patent application Ser. No. 09/874,342, filed Jun. 5, 2001, Now U.S. Pat. No. 6,632,759, which claims benefit of 60/221,811 filed Jul. 31, 2000 to Borrelli, et al, and entitled "UV Photosensitive Melted Germano-Silicate Glasses". The invention described in this application is assigned to the assignee of the present invention, and the disclosure of this application is incorporated by references herein and for all purposes.

FIELD OF THE INVENTION

The present invention relates generally to photosensitive bulk glass, and particularly to meltable alkali boro-aluminno-silcate glasses.

BACKGROUND OF THE INVENTION

Optical transmission systems, including optical fiber communication systems, have become an attractive alternative for carrying voice and data at high speeds. While the performance of optical communication systems continues to improve, there is increasing pressure on each segment of the optical communication industry to reduce costs associated with building and maintaining an optical network.

Quite often, optical communication systems require various types of optical filter elements. For example, diffractive filter elements may be used to effect the separation (demultiplexing) of individual wavelength channels in a wavelength division multiplexed (WDM) optical system. In addition, these refractive filter elements may be used to compensate for the ill-effects of dispersion, to include chromatic dispersion (CD) and polarization mode dispersion (PMD).

One type of diffractive optical filter is a Bragg grating. Bragg gratings are interferometric optical devices which have been employed in a variety of applications including multiplexing/demultiplexing applications and dispersion compensation applications. Bragg gratings may be used to reflect light of a wavelength which satisfies the Bragg phase matching condition, and which transmits all other wavelengths.

One useful technique for forming a Bragg grating is to selectively alter the index of refraction in a substrate in a periodic manner. This selective alteration of the index of refraction can be used to fabricate both Bragg gratings in which the period of the index of refraction is regular, as well as chirped gratings in which the period of the index of refraction varies as a function of distance.

What is needed is a batch meltable glass material which is photosensitive, and which overcomes certain drawbacks of conventional glass materials.

SUMMARY OF THE INVENTION

The invention includes a photosensitive glass. According to an exemplary embodiment of the present invention a meltable photosensitive glass has a hydrogen content of greater than $10^{17}$ hyrogen molecules/$cm^3$. The refractive index change in the exposed portions of the glass is $10^{-4}$ ($\Delta n > 10^{-4}$) measured at a wavelength of 633 nm; and the glass is photosensitive to light having a wavelength of less than 300 nm.

According to another exemplary embodiment of the present invention, the starting glass is a photosensitizable alkali boro-alumino-silicate glass that can be loaded with hydrogen to make it photosensitive. Preferably, the glass is a below 300 nm photosensitive glass which has a composition of 40–80 mole % $SiO_2$, 2–15 mole % $GeO_2$, 10–36 mode % $B_2O_3$, 1–6 mole % $Al_2O_3$ and –210 mole % $R_2O$ where R is chosen from the alkali elements with the glass exhibiting photosensitivity to below 300 nm wavelengths.

The invention further includes a molecular hydrogen loadable photosensitive bulk glass. The photosensitive bulk glass is an alkali boro-alumino silicate glass with a melting temperature no greater than 1650° C. Preferably, the glass has a batch composition comprising no greater than 85 mode % $SiO_2$, no less than 10 mole % $B_2O_3$, no less than 2 mole % $GeO_2$ and a combined alkali and alumina content no greater than 20 mole % $GeO_2$, and a combined alkali and alumina content no greater than 20 mole % $Al_2O_3$+Alkali with the glass having a molecular hydrogen loadable level of at least $10^{18} H_2$ molecules/$cm_3$.

The invention further includes a method of making a refractive index pattern. The invention includes providing a photosensitive bulk glass having a 300 nm absorption less than 20 dB/cm, providing a radiation source below 300 nm, forming a pattern with the below 300 nm radiation, and exposing the photosensitive bulk glass to the pattern to form a modulated refractive index pattern in the bulk glass.

The invention further includes a method of making a molecular hydrogen loadable photosensitive glass optical device preform. Preferably, the method comprises making a refractive index pattern preform out of melted glass. The method includes providing a germania silica glass powder batch with transition metal contamination level $\leq 1$ ppm by heavy metals. The method includes melting contamination level $\leq 1$ ppm by weight for heavy metals. The method includes melting the silica glass powder batch to form a homogeneous glass melt, cooling the glass melt into a UV transmitting bulk glass having a 300 nm absorption less than 20 dB/cm and forming the bulk glass into an optical device preform in which refractive index patterns can be made.

The invention further includes a photosensitive glass optical refractive index pattern preform for use with UV light in the formation of refractive index patterns. The preform is comprised for use with UV light in the formation of refractive index patterns. The preform is comprised of an Alkali boro-alumino-silicate glass with a 300 nm absorption less than 20 dB/cm. The preform glass has a UV wavelength inducable modulated refractive index $\Delta n$ level greater than $10^{-5}$ with a molecular hydrogen level of at least $10^{18} H_2$ molecules/$cm^3$.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 4 inset is a plot of absorbance versus wave numbers (cm$^{-1}$) showing OH stretching vibrations and absorbance before (dashed line) and after (solid line) a 90 minute UV exposure of 20 mJ/cm$^2$/pulse.

FIG. 6 inset show the geometry of the UV exposure and the reflectivity and transmission measurements of the plot.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

It is noted also that the refractive index change (Δn) as referenced herein is measured at 633 nm. In many occurances this is specifically noted. However, if not specifically noted at a particular occurance, it is understood that the index change is measured at 633 nm.

Briefly, the present invention relates to meltable photosensitive glass materials. According to an exemplary embodiment of the present invention, a meltable photosensitive glass material has a molecular hydrogen content that is greater than $10^{17}$/cm$^3$. When exposed to light having a wavelength of less than 250 nm, the refractive index change in the exposed portions of the photosensitive glass material is less than $10^{-4}$ (Δn<$10^{-4}$) (measured at 633 nm). Usefully, gratings, as well as other structures, may be formed in the glass material by selective exposure of the glass material to light of a wavelength range at which the glass material is photosensitive.

According to an exemplary embodiment, the present invention comprises a below 250 nm UV light photosensitizable glass with 40–80% SiO$_2$, 2–15 mole % GeO$_2$, 10–36 mole % B$_2$O$_3$, 1–6 mole % Al$_2$O$_3$ and 2–10 mole % R$_2$O wherein R is an alkali, with glass photosensitive when loaded with hydrogen. Preferably, the glass comprises 42–73 mole % SiO$_2$, 2–15% mole % GeO$_2$, 25–36 mole % B$_2$O$_3$, 2–6 mole % Al$_2$O$_3$, and 2–6 mole % R$_2$O. Usefully, the glass comprises 42–67 mole % SiO$_{2, 2-15}$ mole % GeO$_2$, 25–36 mole % B$_2$O$_3$, 2–6 mole % Al$_2$O$_3$, and 2–6 mole % R$_2$O. Preferably R$_2$O is at least one Alkali oxide chosen from the group of Na, Li, and K. In an embodiment R is Na. In another exemplary embodiment R is Li. In a further exemplary embodiment R is K. Moreover, in embodiments of the invention the R Alkali content of the glass includes mixtures of Na, Li, and K. Preferably, the glass has an alkali-alumina ratio in the range of ±0.5. Usefully, the glass is essentially free of non-bridging oxygen ions and such are minimized and inhibited by the glass components.

In accordance with an exemplary embodiment of the present invention, the photosensitizable glass has a hydrogen content that is $\leq 10^{17}$H$_2$ molecules/cm$^3$. The hydrogen may be loaded by known techniques in the glass.

It is noted that according to an exemplary embodiment the glass has a loadable hydrogen content $\leq 10^{19}$H$_2$ molecules/cm$^3$. Preferably, the glass is loadable and loaded with at least 2×$10^{19}$H$_2$ molecules/cm$^3$, and preferably the hydrogen content is Preferably at least 5×$10^{19}$ hydrogen molecules per cm$^3$ according to another exemplary embodiment. Such hydrogen load levels are preferably achieved with a hydrogen loading temperature no greater than 200° C. with the molecular hydrogen entering the glass as molecular hydrogen (H$_2$) and remaining as molecular hydrogen in the glass in that the hydrogen molecules contained in the glass do not disassociate and react with the glass until irradiated.

The photosensitizable glass has a transition metal contaminant level $\leq$1 ppm by weight for transition metal contaminants. The glass also has a heavy metal contaminant level $\leq$1 ppm by weight for heavy metal contaminants. Preferably the glass has a Fe content <1 ppm by weight Fe, and more preferably <1 ppm by weight Fe. Preferably the glass has a Ti content <1 ppm by weight Ti, and more preferably <1 ppm by weight Ti. The photosensitizable glass has a 300 nm absorption less than 30 dB/cm, usefully less than 20 dB/cm, and more preferably less than 15 dB/cm. Even more preferred the 250 nm absorption is 10 dB/cm and most preferably <5 dB/cm.

Preferably the photosensitizable glass is melted glass, and most preferably a non-sintered glass. The glass has a melting temperature $\leq$1650° C., and preferably $\leq$1600° C. which provides for formation by melting a mixed batch of glass feedstock powders for form a homogeneous glass melt which can be cooled into the glass. Preferably the glass has a melting temperature $\leq$1550° C., and more preferably $\leq$1500° C. Preferably the glass has a softening temperature $\leq$700° C. Such glass forming temperatures allow for efficient and economic manufacturing of the glass and avoid the complications of sintering and sintered glass compositions.

Preferably the glass has a below 300 nm wavelength induced modulated refractive index Δn>$10^{-4}$ (measured at 633 nm) where the exposure wavelength is no greater than 300 nm and the glass has a molecular hydrogen content >$10^{17}$H$_2$ molecules/cm$^3$. According to an exemplary embodiment, the inventive glass exhibits photosensitivity as a consequence of exposure to light of no greater then 300 nm wavelength induced modulated refractive index Δn>$10^{-4}$ when loaded with a molecular hydrogen content >$10^{19}$ molecules/cm$^3$. It is noted that the preferable exposure wavelength range to induce the above referenced wavelength induced modulated refractive index is approximately 248 nm to approximately 265 nm. Preferably the glass has a modulated refractive index Δn>2×$10^{-4}$ when hydrogen loaded. It is further noted that the exposure wavelength may be as low as 244nm.

The invention further includes a molecular hydrogen loadable photosensitive bulk glass comprised of an alkali boro-alumino-silicate glass with a melting temperature ≦1650° C. Preferably the alkali boro-alumino-silicate glass has a batch composition of ≦85 mole % $SiO_2$, ≧10 mole % $B_2O_3$, ≧2 mole % $GeO_2$, and a combined Alkali and alumina content <20 mole % $Al_2O_3$+Alkali. Preferably the glass has a molecular hydrogen loadable level of at least $10^{18}H_2$ molecules/$cm^3$, and more preferably at least $10^{19}H_2$ molecules/$cm^3$. More preferably the molecular hydrogen loadable level ≧$2×10^{19}H_2$ molecules/$cm^3$, and most preferred ≧$3×10^{19}H_2$ molecules/$cm^3$. Preferably the batch composition is ≦80 mole % $SiO_2$ and ≧20 mole % $B_2O_3$. More preferably the batch composition has ≦70 mole % $SiO_2$ and 25 mole $B_2O_3$. Preferably the glass has a batch composition with a combined Alkali and alumina content >16 mole $Al_2O_3$+Alkali.

Preferably the photosensitive bulk glass is essentially free of transition metals and with a 300 nm absorption less then 30 dB/cm. Preferably, the transition metal contaminant levels are below 1 ppm by weight, with the iron content <1 ppm by weight and more preferably <0.1 ppm by weight. Preferably the titanium content is <1 ppm by weight, and more preferably <0.1 ppm. Preferably the bulk glass has 300 nm absorption <20 dB/cm, more preferably <15 dB/cm, more preferably <10 dB/cm, and most preferred <5 dB/cm. It is noted that it is useful minimize the impurity levels of iron, other transition metals and OH. Low concentrations of these impurities aids in reducing loss, which will improve the uniformity of gratings formed in the glass materials in accordance with an exemplary embodiment of the present invention.

The glass has a refractive index photosensitivity level modulated Δn>$10^{-5}$ (measured at 633 nm) with a loaded molecular hydrogen content ≦$10^{18}H_2$ molecules/$cm^3$. Such a Δn can be achieved with a 248 nm KrF excimer laser UV exposure of 90 minutes at 12 mJ/$cm^2$/pulse. Preferably the glass has a refractive index photosensitivity level Δn>$10^{-4}$ with a loaded molecular hydrogen content ≦$10^{19}H_2$ molecules/$cm^3$. Preferably the bulk glass is loadable with molecular hydrogen to a molecular hydrogen loaded level of at least $10^{19}H_2$ molecules/$cm^3$ with a hydrogen loading temperature ≦200° C. Preferably the glass has a molecular hydrogen content >$10^{19}H_2$ molecules/$cm^3$ and a below 300 nm wavelength induced modulated refractive index Δn>$10^{-4}$ (measured at 633 nm).

Preferably the bulk glass Alkali boro-alumino-silicate glass batch composition has a $SiO_2$ content ≦65 mole % $SiO_2$, and more preferably ≦60 mole % $SiO_2$. Preferably the bulk glass batch composition has a $GeO_2$ content ≦10 mole % $GeO_2$, more preferably ≦15 mole % $GeO_2$, and most preferred ≧20 mole % $GeO_2$. Preferably the bulk glass batch composition has a combined Alkali and alumina content ≦13 mole % $Al_2O_3$+Alkali, more preferably ≦10 mole % $Al_2O_3$+Alkali, and most preferred ≦5 mole % $Al_2O_3$+Alkali. In a preferred embodiment the Alkali comprises Na. In a further embodiment the Alkali comprises Li. In another embodiment the Alkali includes K. Preferably the bulk glass composition has an $Al_2O_3$ content ≦6 mole % $Al_2O_3$. Preferably the bulk glass composition has a $NaO_2$ content ≦6 mole % $NaO_2$. Preferably the bulk glass has a $B_2O_3$ content ≧30 mole % $B_2O_3$. Preferably the glass has an increased OH content (such as shown by OH stretching vibration spectra) when loaded with molecular hydrogen and exposed to UV radiation, preferably with the glass having an OH range of about 100 to 1,000 OH ppm by weight. Preferably the glass has a chlorine content less than 10 ppm by weight and more preferred <5 ppm, and most preferred <1 ppm.

The bulk glass is a non-sintered glass, and preferably has a melting temperature ≦1,600° C., and more preferred ≦1,550° C. Preferably the glass is a cooled fluid melt mixture formed from a fluid melt, preferably with the fluid melt formed by melting glass batch feedstock powders. In a preferred embodiment the bulk glass is a homogeneous glass device preform body with a homogeneous composition with glass dopants evenly spread throughout the glass body. Preferably the preform body has a homogeneous index of refraction and is free of pre-radiated core and claddings regions with a homogeneous distribution of glass component elements.

The invention includes a method of making a refractive index pattern. Preferably the method comprises making a refractive index pattern grating. The method of making a pattern includes providing a photosensitive bulk glass having a 300 nm absorption less than 30 db/cm, preferably less than 20 db/cm. The method includes providing a below 300 nm radiation source and producing below 300 nm radiation. The method includes forming a pattern with the below 300 nm radiation and exposing the photosensitive bulk glass to the pattern to form a modulated refractive index pattern in the bulk glass. Preferably the provided bulk glass has a <15 dB/cm absorption at 300 nm, more preferably <10 dB/cm, and most preferably <5 dB/cm. Forming the pattern preferably comprises forming a pattern and exposing the bulk glass to the pattern for form a modulated refractive index grating in the bulk glass.

Providing the photosensitive bulk glass preferably includes providing an alkali boro-alumino-silicate glass. The provided bulk glass body preferably is homogeneous in composition and refractive index and does not have separate core/cladding regions.

Providing the photosensitive bulk glass includes providing a non-sintered glass, with the glass being a melted glass. Preferably the glass is a melted glass with a melting temperature ≦1,650° C. More preferably the melting temperature of the bulk glass ≦1,600° C., more preferred ≦1,550° C., and most preferred ≦1,500° C. Providing the photosensitive bulk glass includes providing an alkali boro-alumino-silicate glass batch and melting the glass batch to form an alkali boro-alumino-silicate glass melt. The method includes cooling the glass melt into the bulk glass. Preferably melting includes containing the glass melt in a heated glassy fluid state and forming the glass melt into a coolable body, such as delivering the glass melt through an orifice and to a cooling site.

The provided bulk glass is a molecular hydrogen loadable bulk glass. Preferably the method includes providing a melted bulk glass and loading the bulk glass with at least $10^{18}H_2$ molecules/$cm^3$. Preferably loading the bulk glass includes loading with at least $10^{19}H_2$ molecules/$cm^3$, and more preferably at least $5×10^{19}H_2$ molecules/$cm^3$. Loading bulk glass is preformed with a molecular hydrogen loading temperature <200° C. Preferably the hydrogen loading temperature ≦150° C., more preferably ≦100° C. Preferably a hydrogen load atmosphere of at least 20 atmospheres of hydrogen are used, and most preferably at least 100 atmospheres of $H_2$ is utilized to dope the bulk glass. Such loading can be achieved in high temperature vessels that contain the $H_2$ gas and the bulk glass. Preferably the bulk glass body has a glass body physical size with glass volume and surface area to provide efficient loading of hydrogen, preferably with the bulk glass body being a near net shape of the preform and optical device it is made into. The bulk glass is exposed to the $H_2$ gas pressurized atmosphere for a $H_2$ loading time sufficient and effective such that the center of the bulk glass body has a molecular hydrogen concentration that is at least 90% of the ambient $H_2$ loading atmosphere.

Exposing the photosensitive bulk glass preferably includes exposing the glass to form a pattern by inducing a refractive index $\Delta n \leq 10^{-5}$, and most preferably $\Delta n \leq 10^{-4}$ (again measured at 633 nm).

The invention includes a method of making a molecular hydrogen loadable photosensitive glass optical device preform. The method of making the preform includes providing a germania silica glass batch with a transition metal contamination level $\leq 1$ ppm by weight for heavy metals. The method includes melting the silica glass batch to form a homogeneous glass melt, cooling the glass melt into a UV transmitting bulk glass having a 300 nm absorption less than 20 dB/cm and forming the bulk glass into an optical device preform. Forming the bulk into an optical device preform preferably includes loading the bulk glass with molecular hydrogen to a level of at least $10^{18} H_2$ molecules/cm$^3$, and more preferably at least $10^{19} H_2$ molecules/cm$^3$.

Providing the germania silica glass batch includes providing an alkali boro-alumino-silicate glass batch and melting the glass at a melting temperature $\leq 1,650°$ C. Preferably melting comprises melting at $\leq 1,600°$ C., more preferably $\leq 1,550°$ C., and most preferably $\leq 1,500°$ C. The method of making preferably includes pouring the glass melt to form bulk glass bodies, and more preferably includes delivering the glass melt through a glass forming orifice. Making the bulk glass performs preferably includes forming a preform glass body with a smallest size dimension that is greater than 5 μm.

The invention further includes a photosensitive glass optical refractive index pattern preform for use with UV light in the formation of refractive index patterns. The inventive preform is comprised of an alkali boro-aluminosilicate glass with a 300 nm absorption less than 20 dB/cm. The preform has a below 300 nm UV wavelength inducible modulated refractive index $\Delta n \geq 10^{-5}$ with the bulk glass exhibiting photosensitivity as a consequence of exposure to light of 300 nm or less with a molecular hydrogen level of at least $10^{18} H_2$ molecules/cm$^3$. Preferably the refractive index pattern preform has a UV wavelength inducible modulated refractive index $\Delta n$ level $>10^{-4}$ with a molecular hydrogen level of at least $10^{19} H_2$ molecules/cm$^3$. Preferably the bulk glass preform has a 300 nm absorption less than 15 db/cm, more preferably less than 10 dB/cm, and most preferred less than 5 dB/cm. Preferably the alkali boro-alumino-silicate glass preform is a non-sintered glass body formed by a melting process is result in a melted glass.

EXAMPLES

The invention includes a large UV-induced refractive index change in a melted alkali-alumino-boro-germanosilicate composition that has been loaded with molecular hydrogen. The UV exposures utilized include CW 244-nm light and a pulsed KrF excimer laser at 248-mm. It is noted that a tuneable Nd/YAG laser which emits radiation at 268 nm, 270 nm, 280 nm and 290 nm could be used in place of the KrF excimer laser. A modulated refracted index of the order of $2–3\times10^{-4}$ has been measured (at 633 nm) in the bulk glass.

It is believed that the ability to load with molecular hydrogen, and the photoreaction, depends on the composition of the glass. The UV spectroscopy of the bulk glass before and after exposure, as well as the magnitude of the induced refractive index correlates well with the growth of the OH absorption as measured in the IR (OH stretching vibrations).

Figure 6:
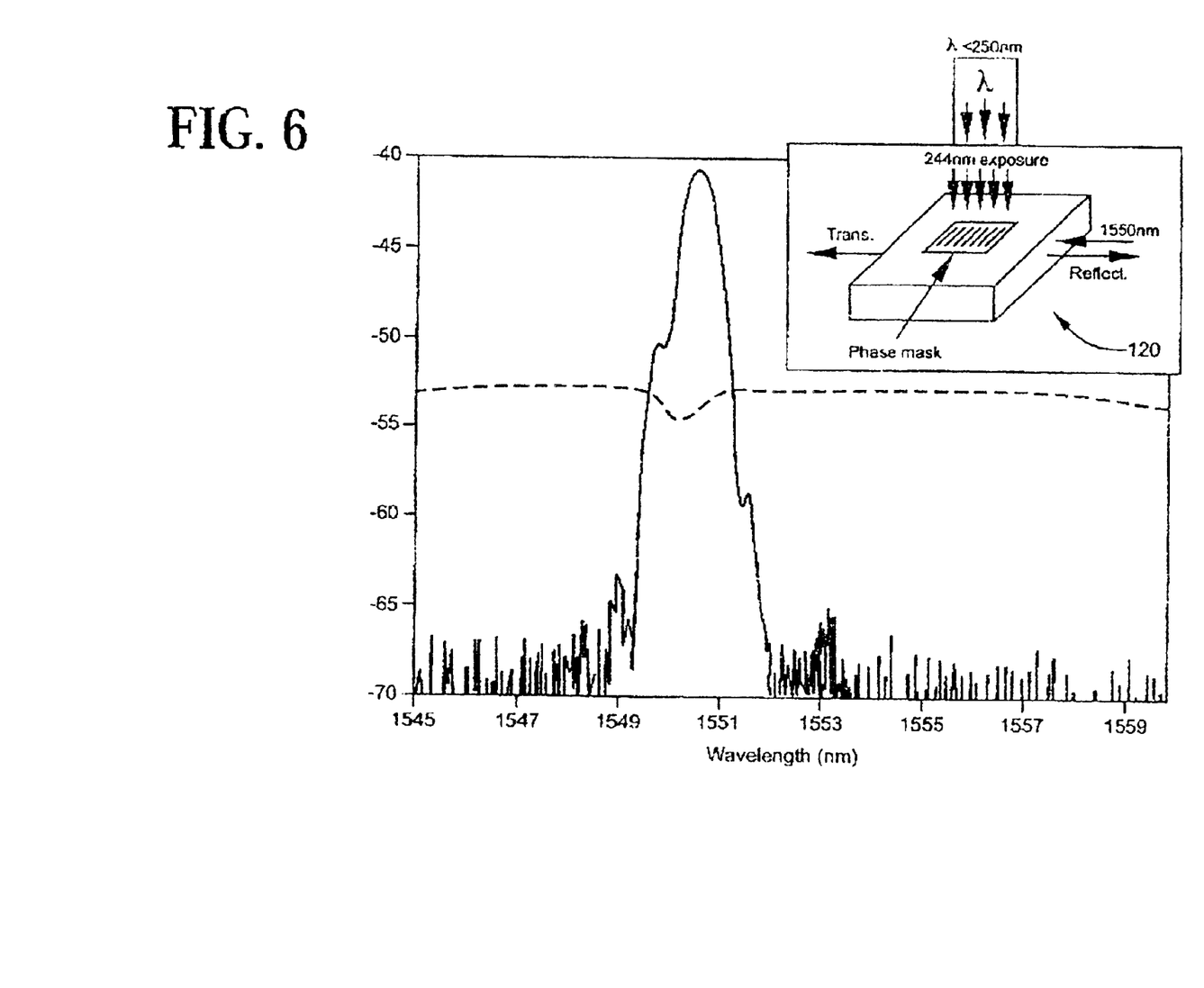
FIG. 6 is a plot of intensity (dBm) versus wavelength (1545 nm–1559 nm) of refractive index pattern grating formed in the bulk glass in accordance with the invention.

As shown in FIG. 6, a Bragg grating was made in a bulk glass ample (Glass 5g, Glass Composition Table) by exposing through a phase mask from the top face, with a measured transmission and reflectivity as shown.

Figure 10:
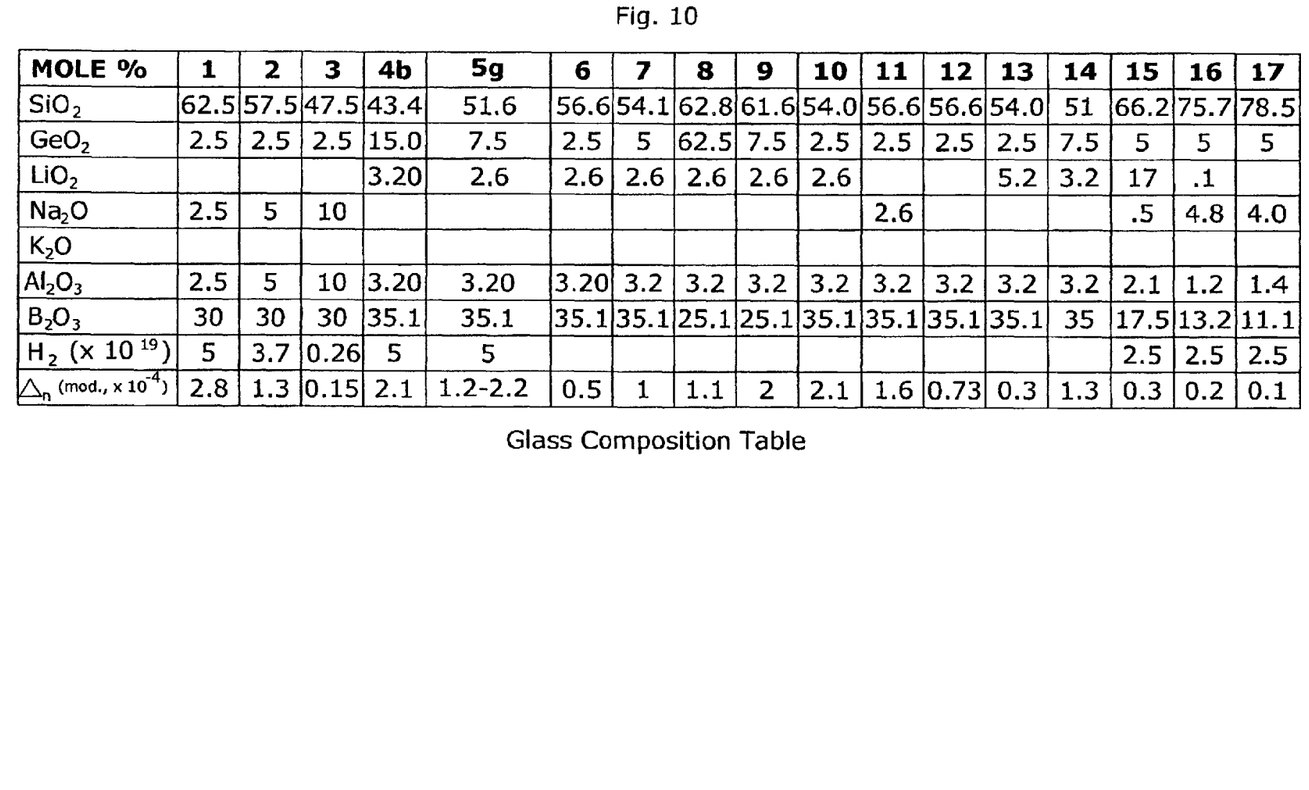
FIG. 10 is a tabular representation of glass composition in accordance with an exemplary embodiment of the present invention.

In order to provide melted glasses, the invention utilizes various constituents to make the glass softer and lower the melting temperature. This includes using constituents like alkali, alumina and boron to lower the melting temperature and to decrease the viscosity. In a preferred embodiment the glass batch melting temperature is lowered by using a sufficient amount of a fluoride of the glass components to lower the melting temperature. For example with Glass 4b (See Glass Composition Table of FIG. 10) aluminum fluoride is utilized with a F batch composition of about 3.3 wt. %. in a preferred embodiment the batch composition melting temperature is lowered with a batch composition incorporating of fluorine at a batch wt. % of $\leq 6$ wt. % F. The lowering of the melting temperature is done in such a way as not to move the fundamental absorption beyond 248-nm (5-eV).

The fundamental absorption edge of pure silica, for example, is determined by the transition form the band consisting of the overlapping 2p oxygen orbitals (valence band) to the band made up from the sp$^3$ non-bonding orbitals of silicon (conduction band). The addition of alkali introduces another set of levels associated with non-bridging oxygen. When the concentration is high enough, a new band appears above that of the original valence band, thus moving the fundamental absorption edge to longer wavelengths. On the other hand, the addition of the network substitution ions such as boron, aluminum, and germanium has much less influence on the absorption edge.

Impurities such as transition metal ions or heavy metal ions that are inadvertently incorporated into glass, either from the batch materials, the containment crucible, the furnace or forming, must be kept to the <1 ppm level. These ions, even in small amounts have a dramatic adverse effect on the UV-absorption edge.

The invention includes making a $SiO_2$-$GeO_2$ bulk glass that can be melted and formed in a conventional batch way be limiting the additional constituents sufficiently so as to maintain high transparency at 248-nm, and yet achieve melting at a reasonable temperature (1,500° C.) and a softening temperature of approximately 600° C. (softening temperature below 700° C. preferred).

Glasses were made from pure starting materials, in particular low iron content sand. They were melted in clean platinum crucibles at 1,550° C. for 16 hours. In the initial sampling procedure, the glass was poured into patties and annealed. Subsequently, the quality of the glass was improved in terms of (striae) defects and cords by using semi-continuous melting where the glass is not poured from a melt crucible which is the source of much of the striae, but delivered through an orifice.

The hydrogen loading was done in a Parr™ pressurized reactor using 150° C. loading temperature at 100 atm pressure. The IR spectroscopy was done with a Nicolet™ FTIR spectrometer to determine the molecular hydrogen ($H_2$) content.

Figure 1:
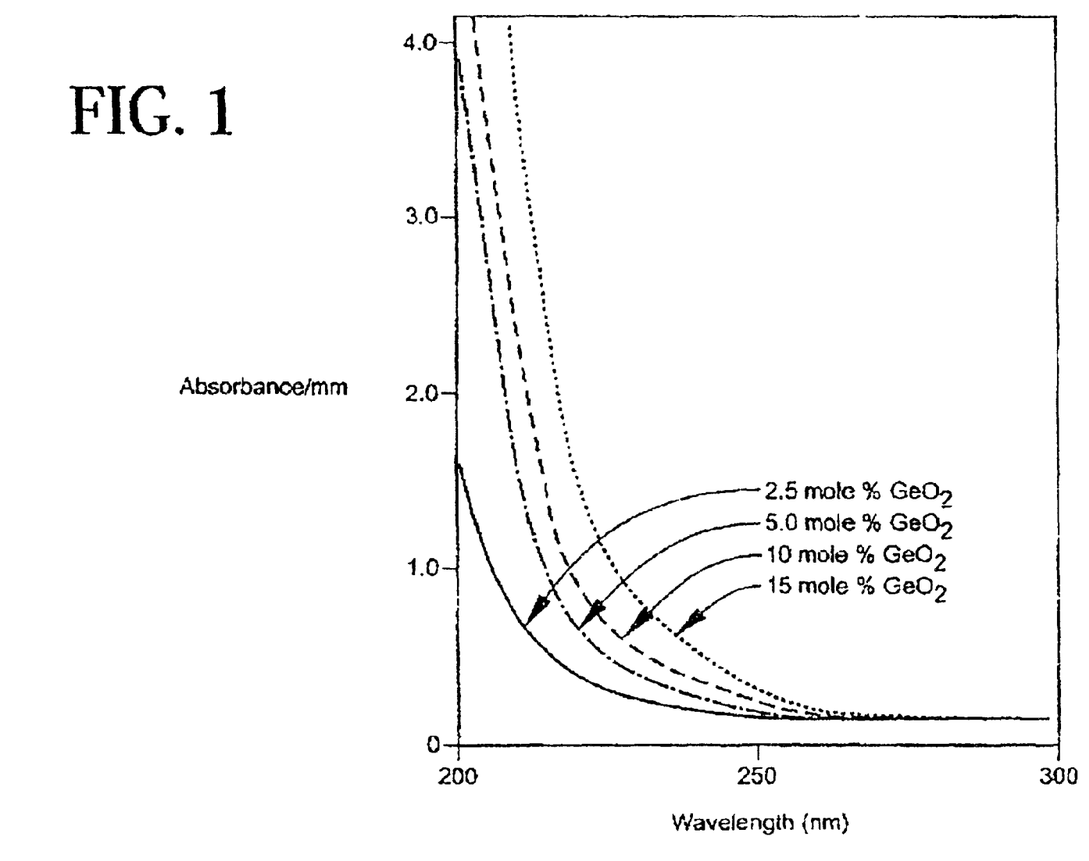
FIG. 1 is a plot of absorbance/nm versus UV wavelength (nm) (200–300 nm) in accordance with the invention.

The effect on the absorption spectrum with change in $GeO_2$ content for alkali-alumino-boro-silicate glass family of $R_2O$ (3–4 mole %), $Al_2O_3$ (3–4 mole %), $B_2O_3$ (25–35 mole %), $GeO_2$ (2.5–15 mole %), and $SiO_2$ (66.5–42 mole %) is shown in FIG. 1. In all cases we were able to maintain high transmittance at below 300 nm wavelength of 248-nm which was to be the UV exposure excitation wavelength.

We exposed samples from each system to pure hydrogen ambient at 100 atm at 150° C. in order to impregnate the samples with molecular hydrogen. The higher temperature was used to speed up the diffusion process for samples that were a few millimeters thick and yet not allow the thermal reaction to occur. We used IR spectroscopy to determine the molecular hydrogen content. Photosensitivity was achieved with the inventive glasses that had a loaded molecular hydrogen content. Hydrogen load levels up to $5\times10^{19}H_2$ molecules/cc were obtained with the inventive glass.

In order to measure the UV-induced photosensitivity, we hydrogen loaded 0.5-mm thick bulk glass samples. We then exposed them through a chrome absorption mask with a 10 $\mu$m grating pitch. The UV exposure source was a KrF excimer laser operating at 248-nm. The peak fluence was from 20–60 mJ/cm$^2$/pulse at 50 Hz for periods of time running from 5–120 min.

After the UV exposure, the sample was illuminated by a spatially filtered He—Ne laser and the diffraction efficiency of the induced phase grating was measured from the ratio of the intensity of the $1^{st}$ to $0^{th}$ order. As long as the diffraction efficiency is relatively weak one can use the following simple formula for efficiency.

$$Eff = \left(\frac{\pi \Delta n L}{\lambda}\right)^2 \quad (1)$$

Here, $\Delta n$ is the modulated refractive index change ($n=n_0+\Delta n \cos(2\pi 2/\Lambda)$), L is the grating index and $\Lambda$ is the period of the index pattern.

Figure 2A:
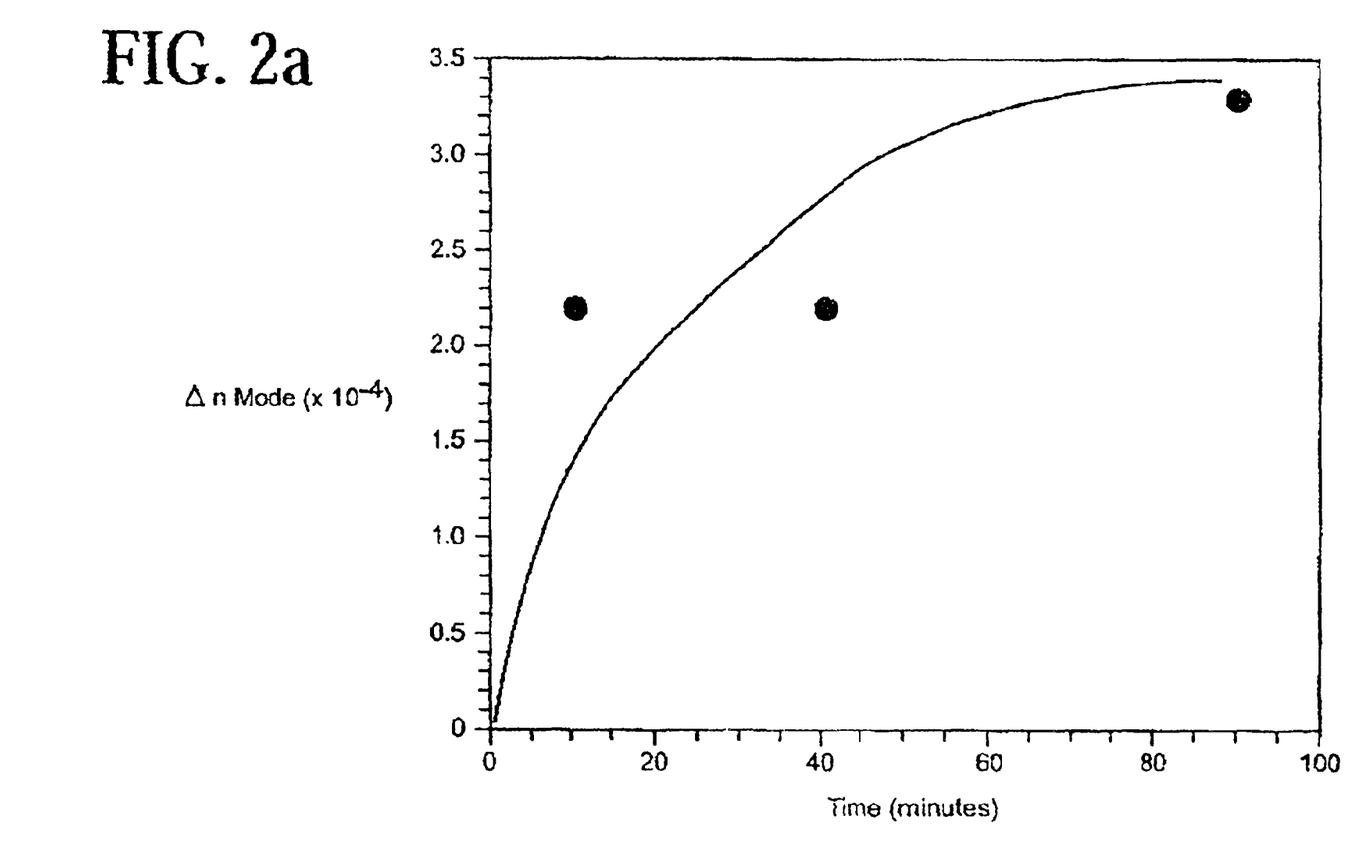
FIG. 2a is a plot of induced modulated refractive index [$\Delta n (\times 10^{-4})$] versus UV exposure time (minutes) in accordance with the invention.
Figure 2B:
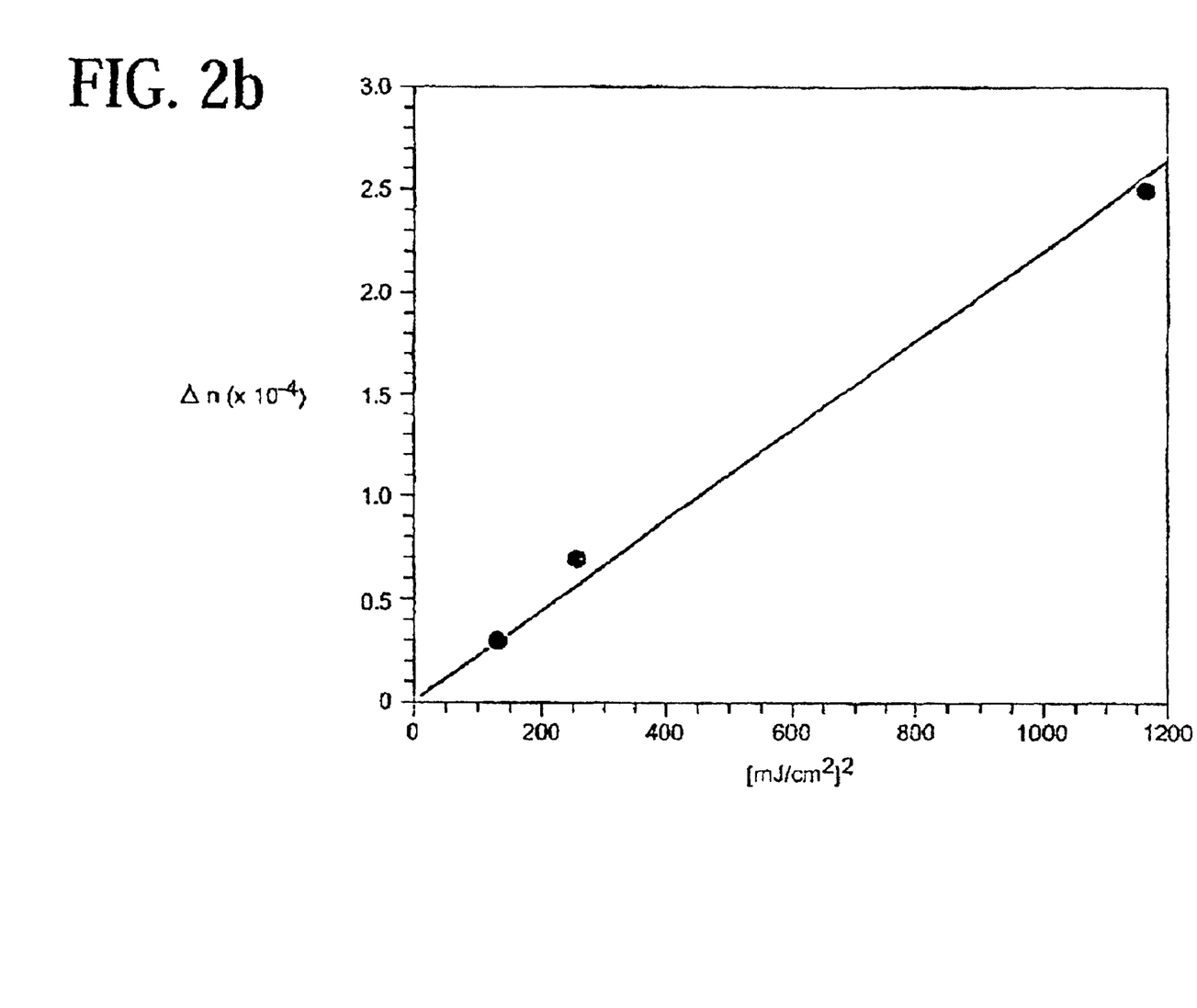
FIG. 2b is a plot of induced modulated refractive index [$\Delta n (\times 10^{-4})$] versus UV exposure fluence [$mJ/cm^2$] in accordance with the invention.

The range of measured values of the induced refractive index after a fixed 248-nm UV exposure was from $1\times10^{-4}$ to $3\times10^{-4}$ for the inventive alkali-alumino-boro-silicate glasses. The induced modulated refractive index as a function of the exposure time at fixed fluence is shown in FIG. 2a. FIG. 2b shows the measured induced index as a function of fluence at fixed time. The later is well represented by using the square of the fluence.

A set of glasses with fixed germania content was loaded with $H_2$ and UV exposed at 248-nm. The Glass Composition Tables gives the compostion, relative amounts of $H_2$ incorporated and the 248-nm excimer laser induced refractive index change for the set.

Figure 3:
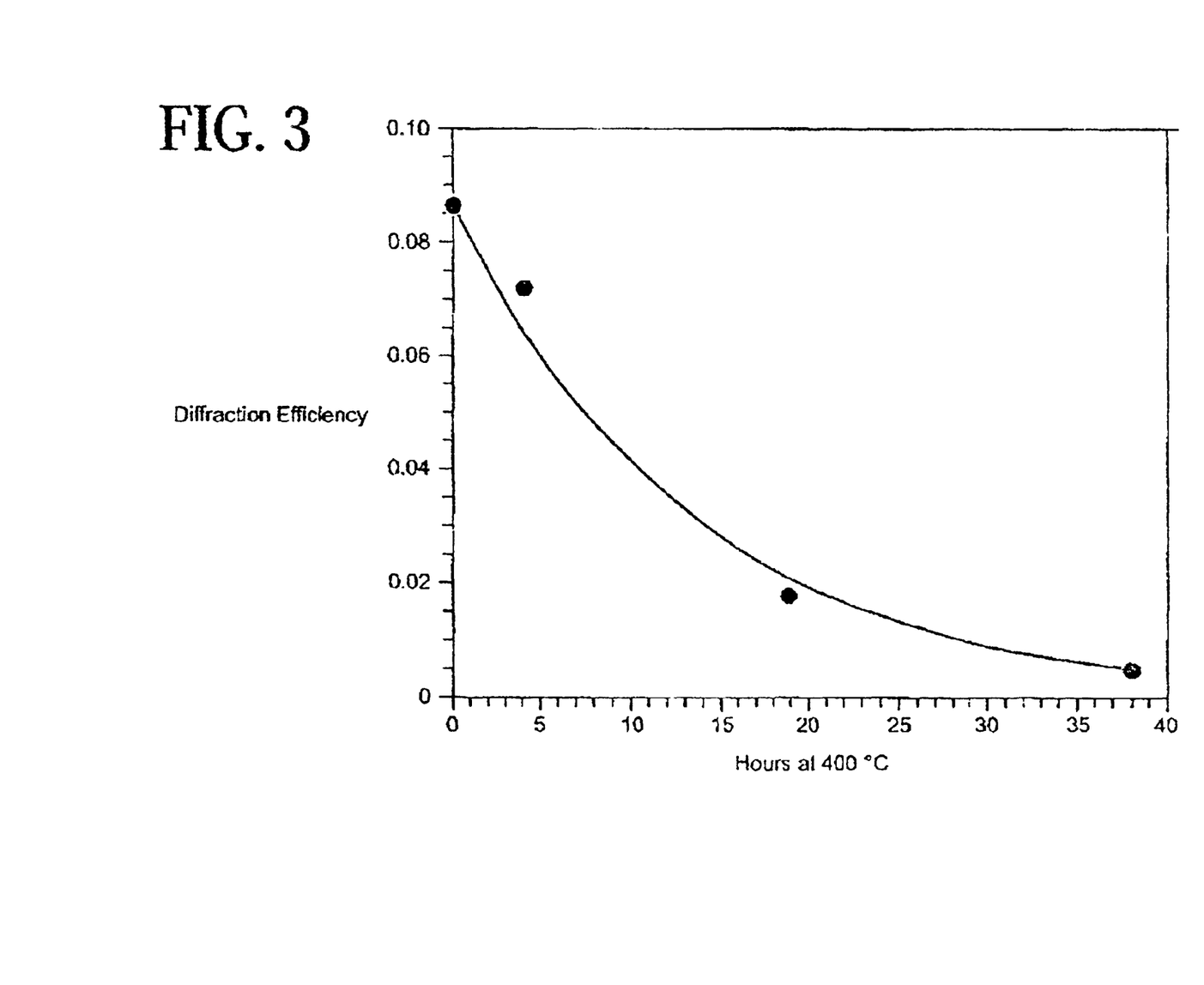
FIG. 3 is a photosensitivity thermal stability plot diffraction efficiency of induced refractive index changes in the bulk glass versus hours heated at 400° C. in accordance with the invention.

The thermal stability of the induced refractive index change was investigated by heating a sample having a grating and re-measuring the grating efficiency with time at temperature. The change with time after heating to 400 degrees is shown in FIG. 3.

We have produced UV-induced refractive index changes in melted non-sintered bulk glasses, similar in magnitude to that seen in vapor deposition sintered flame or plasma prepared glasses, when a high concentration of molecular hydrogen can be obtained. This follows directly from our observation that preferred melted glasses where we see molecular $H_2$ ($>10^{18}$/cm$^3$, as estimated by IR spectroscopy) we preferably obtain a measureable UV-induced refractive index change.

Figure 4:
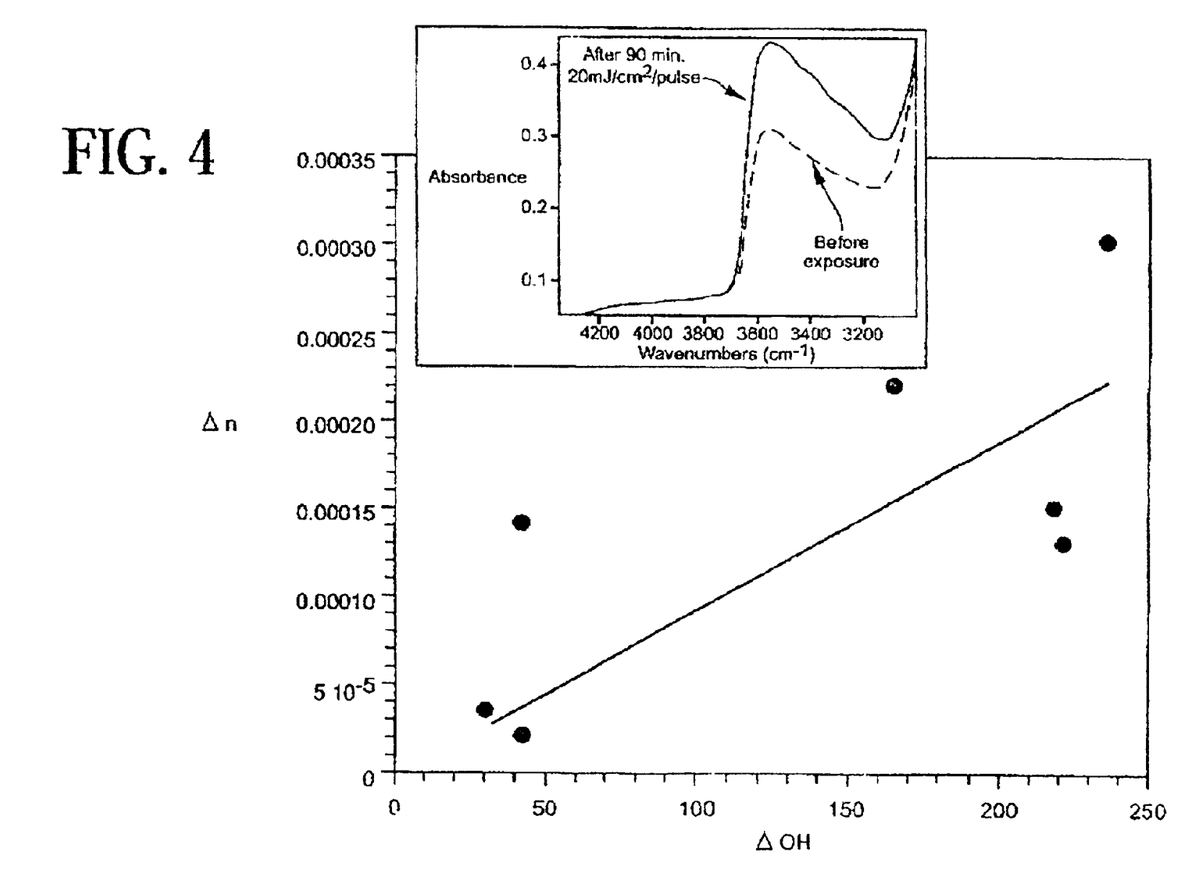
FIG. 4 is a plot induced refractive index [Δn] versus OH concentration in accordance with the invention.
Figure 5:
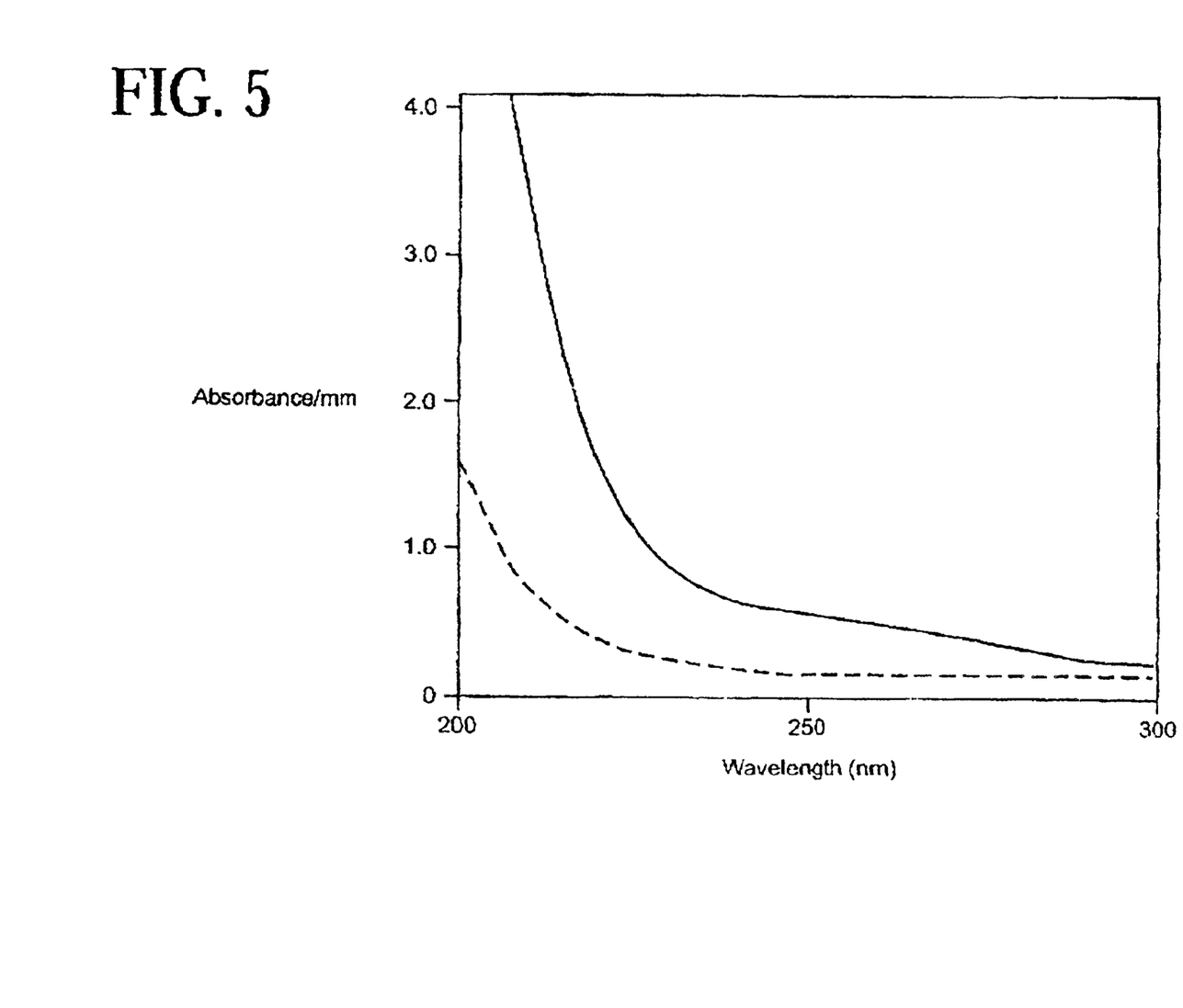
FIG. 5 is a plot of absorbance versus UV wavelength (nm) before (dashed line) and after (solid line) the 90 minute UV exposure of 20 mJ/cm$^2$/pulse of FIG. 4.

The mechanism for the molecular-mediated UV-induced photosensitivity seems to be consistent with that proposed for the hydrogen mediated effect found in the $SiO_2$-$GeO_2$ material prepared by methods other than melting such as vapor deposition and sintering. FIG. 4 shows the relationship of the increase in hydroxyl concentration (measured from the OH stretching vibration; see inset) with the induced refractive index also as shown in FIG. 5. This is also a large change in UV absorption after exposure.

We have observed stress that derives from the UV-exposure. This suggests that a volume change is occurring. From the sign of the birefringence we determine that the volume change corresponds to a densification. The refractive index contribution computed from this effect is small compared to the overall measured $\Delta n$.

Figure 7:
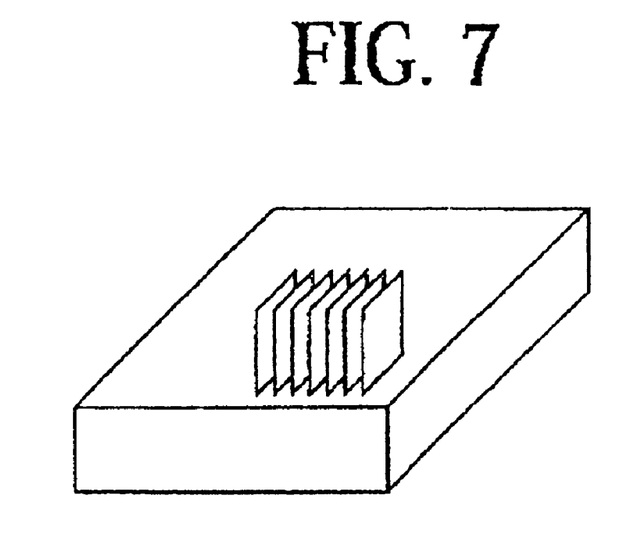
FIG. 7 illustrates the refractive index pattern grating of FIG. 6.
Figure 7A:
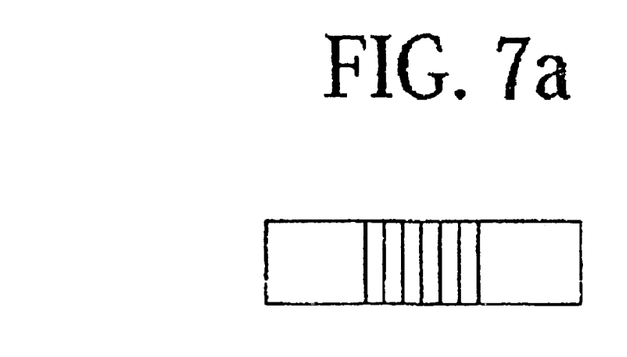
FIG. 7a is a cross-section showing the refractive index pattern grating in the bulk glass.

As shown in FIG. 6, a bulk glass sample of Glass 5g of the Glass Composition up Table (glass block of 5×5×3 mm$^3$) was exposed through the wide face using a 244-nm CW laser (0.35 W for preferred UV exposure time of 30–60 minutes) utilizing a phase mask with a period such as to satisfy the Bragg condition at 1,550-nm to produce a refractive index pattern. The grating length was 2.5-nm. The reflectivity and transmission of the grating is shown in FIG. 6. The inset shows the geometry of the exposure and the reflectivity and transmission measurement. From the grating transmission measurement (1.5–2 db decrease corresponding to 30–40% reflectivity in the 2.5-mm long grating), a modulated refractive index change of 0.12–0.14×10$^{-3}$ is calculated at 1,550-nm. FIG. 7 shows the refractive index pattern grating formed in the bulk glass preform glass block. FIG. 7a is a cross-section showing the refractive index pattern grating in the bulk glass preform glass block.

Figure 8:
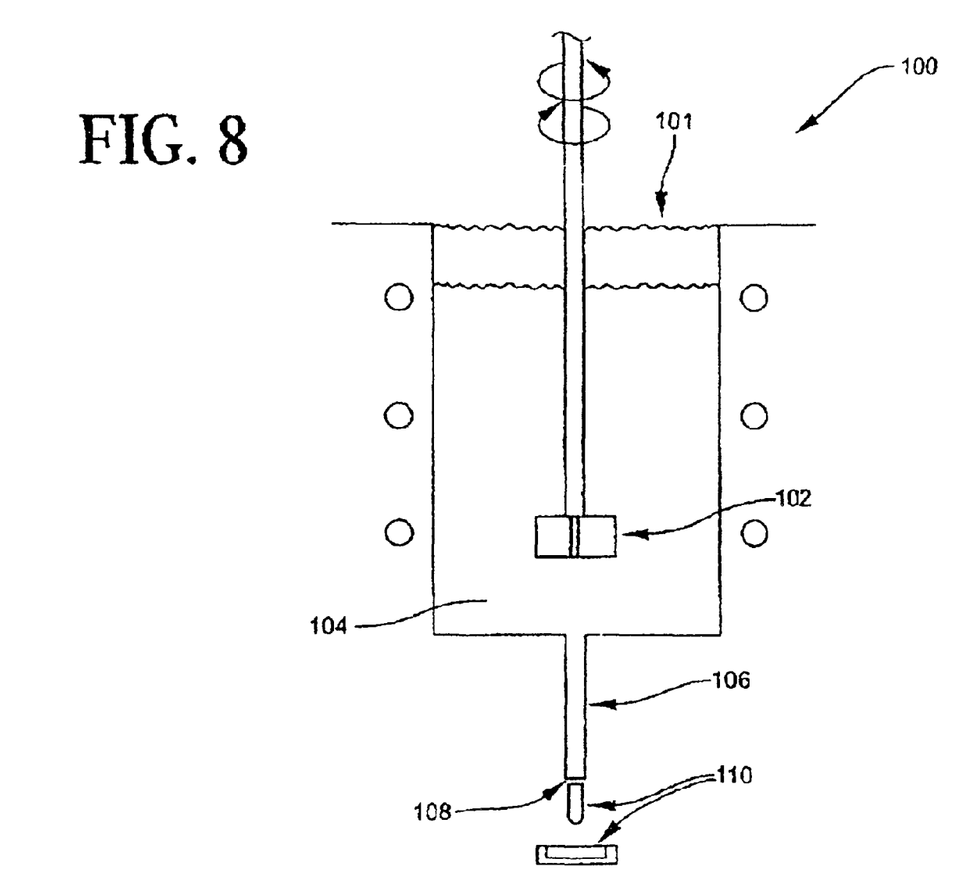
FIG. 8 illustrates a method in accordance with the invention.

Glass 4b of the Composition Table is preferred composition of the invention. The weight percent batch composition was 35.8 wt. % $SiO_2$, 21.5 wt. % $GeO_2$, 4.48 wt. %, $Al_2O_3$, 3.38 wt. % F, 1.31 wt. $Li_2O$, and 33.5 wt. % $B_2O_3$. The batch material powders were ball milled to provide a homogeneous batch mix. For $SiO_2$, high purity silica sand powder, acb as IOTA-6 brand $SiO_2$ from the Unimin Corporation, Spruce Pine, N.C. 28777, was utilized with the high purity silica sand having a Fe impurity level of less than 0.1 ppm. For $GeO_2$, high purity germanium dioxide powder such as Chemical Grade No. 1-29/99.999% purity $GeO_2$ from the Electro-Optic Materials Dept., Eagle-Picher Technologies, LLC, Quapaw, Okla. 74363, was utilized with a purity having 0.1% maximum chloride content, $\leq$1 ppm Fe$\leq$1 ppm MG, $\leq$0.5 ppm Ni, and no detectable Pb (1 ppm detect limit), and no Zn (10 ppm detect limit). For aluminum, high purity aluminum oxide powder, such as Gamma brand aluminum oxide 99.999% from Alfa Aesar, A Johnson Mathey Company, Ward Hill, Mass. 01835, was utilized with the 99.999% purity. For aluminum, high purity aluminum fluoride was also used, such as Alufluor brand aluminum fluoride from LidoChem, Hazlet, N.J. 07730. For lithium, lithium carbonate was used, such as the Tech Grade 99+% purity Li2CO3 brand from FMC Corporation, Lithium Div., Gastonia, N.C. 28054, with a 99%+purity, with Fe2O3 wt.$\leq$0.004 and a Cl wt. %$\leq$0.01. Also for lithium, lithium nitrate crystal was used, such as available from VWR Scientific, Rochester, N.Y. 14603. For boron, boric oxide was used, such as Hi purity brand Anhydrous Boric Acid from Stetson Chemicals, Inc., 391 Exchange St., Buffalo, N.Y. 14204. The batch powder mixture after ball milling was loaded into a large vertically oriented platinum lines cylindrical furnace 100 as shown in FIG. 8. A total batch mass of 25 kg was used with furnace 100 in a semi-continuous run.

Figure 9:
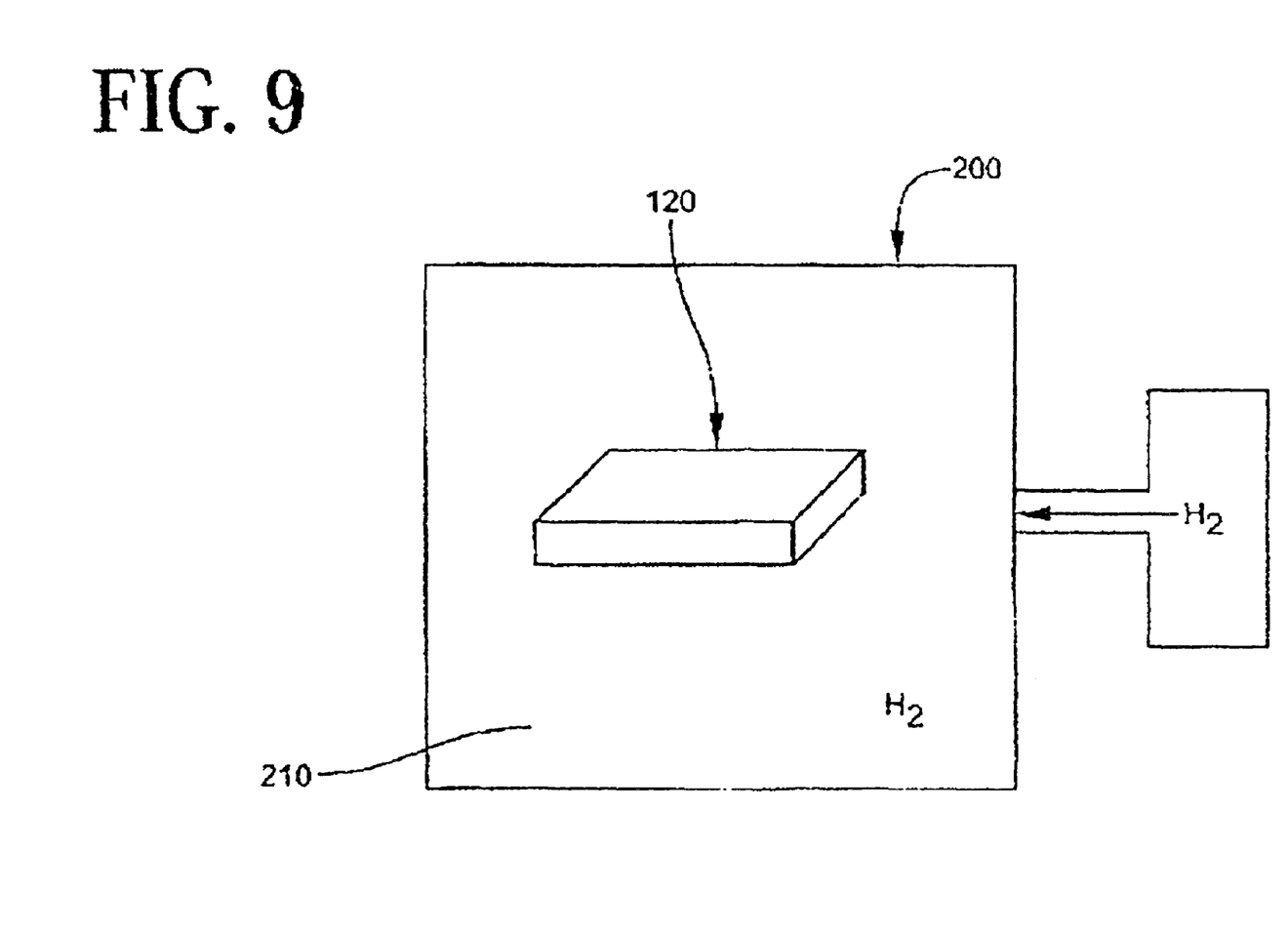
FIG. 9 illustrates a method in accordance with the invention.

Batch powder mixture 101 was melted at 1,550° C. Furnace 100 includes a stirrer 102 for stirring glass melt 104 to provide a homogeneous glass melt. Furnace 100 includes a down corner 106 and a down corner orifice 108 for delivering a bulk glass body 110. Bulk glass bodies 110 were made with a general dimension of 105×4×4 inches (3.81× 10.16 s 10.16 cm) and annealed at 414° C. The annealed bulk glass bodies 110 were cut, finished, and polished to provide small bulk glass bodies 120 having a rectangular block shape. Bulk glass bodies 120 had a dimension of 5×5×3 mm3. As shown in FIG. 9, bulk glass bodies 120 were loaded with molecular hydrogen (H2) in a hydrogen pressure vessel 200 using hydrogen atmosphere 210 of about 100 atmospheres to provide H2 loaded bulk glass body performs 120.

The invention having been described in detail in connection through a discussion of exemplary embodiments, it is clear that modifications of the invention will be apparent to one having ordinary skill in the art having had the benefit of the present disclosure. Such modifications and variations are included in the scope of the appended claims.

What is claimed is:

1. A meltable photosensitive glass having a molecular hydrogen content of $\leq 10^{17} H_2$ molecules/cm$^3$ and an induced modulated refractive index $\Delta n > 10^{-4}$ by radiation having a wavelength below 300 nm.

2. A glass as recited in claim 1, wherein the glass is photosensitizable to light having a wavelength of less than 300 nm, and wherein said glass comprises 40–80 mole % $SiO_2$, 2–15 mole % $GeO_2$, 10–36 mole % $B_2O_3$, 1–6 mole % $Al_2O_3$, and 2–10 mole % $R_2O$ wherein R is an alkali metal.

3. A glass as recited in claim 2, wherein said glass comprising 42–73 mole % $SiO_2$, 2–15 mole % $GeO_2$, 20–36 mole % $B_2O_3$, 2–6 mole % $Al_2O_3$, and 2–8 mole % $R_2O$.

4. A glass as recited in claim 2, wherein said glass comprising 42–67 mole % $SiO_2$, 2–15 mole % $GeO_2$, 25–36 mole % $B_2O_3$, 2–6 mole % $Al_2O_3$, and 2–6 mole % $R_2O$.

5. A glass as recited in claim 2, wherein R comprises Na.

6. A glass as recited in claim 2, wherein R comprises Li.

7. A glass as recited in claim 2, wherein R comprises K.

8. A glass as recited in claim 2, wherein R is at least one alkali metal chosen from a group consisting of Na, Li, and K.

9. A glass as recited in claim 2, wherein said molecular hydrogen content is loaded in said glass and said content is $\leq 10^{18} H_2$ molecules/cm$^3$.

10. A glass as recited in claim 2, wherein said molecular hydrogen content is loaded in said glass and said content is $\geq 10^{19} H_2$ molecules/cm$^3$.

11. A glass as recited in claim 2, having a transition metal contaminant level of $\leq 1$ ppm by weight for transition metal contaminants.

12. A glass as recited in claim 2, having a heavy metal contaminant level $\leq 1$ ppm by weight for heavy metal.

13. A glass as recited in claim 2, having a Fe content <1 ppm by weight Fe.

14. A glass as recited in claim 2, having a Ti content <1 ppm by weight Ti.

15. A glass as recited in claim 2, having a 300 nm absorption less then 20 dB/cm.

16. A glass as recited in claim 9, said having a modulated refractive index $\Delta n \geq 2 \times 10^{-4}$.

17. A glass as recited in claim 1, having a melting temperature $\leq 1,650°$ C.

18. A glass as recited in claim 1, having a melting temperature $\leq 1,600°$ C.

19. A glass as recited in claim 1, having a melting temperature $\leq 1,550°$ C.

20. A glass as recited in claim 1, having a melting temperature $\leq 1,500°$ C.

21. A glass as recited in claim 1, having a softening point <700° C.

22. A glass as recited in claim 2, wherein said glass has a alkali/alumina ratio in the range of 1±0.5.

23. A glass as recited in claim 1, wherein said molecular hydrogen content is a loadable hydrogen content $\geq 10^{18} H_2$ molecules/cm$^3$.

24. A glass as recited in claim 1, wherein said molecular hydrogen content is a loadable hydrogen content $\geq 10^{19} H_2$ molecules/cm$^3$.

25. A molecular hydrogen photosensitive glass, said glass comprised of an alkali boro-alumino-silicate glass having a melting temperature $\leq 1,650°$ C., said alkali boro-alumino-silicate glass having a batch composition comprising $\leq 85$ mole % $SiO_2$, $\geq 10$ mole % $B_2O_3$, $\geq 2$ mole % $GeO_2$, and a combined alkali metal and alumina content <20 mole % $Al_2O_3$+Alkali metal, said glass having a molecular hydrogen loadable level of at least $10^{18} H_2$ molecules/cm$^3$.

26. A glass as recited in claim 25, having a batch composition with $\leq 80$ mole % $SiO_2$ and $\geq 20$ mole % $B_2O_3$.

27. A glass as recited in claim 25, having a batch composition with $\leq 70$ mole % $SiO_2$ and $\geq 25$ mole % $B_2O_3$.

28. A glass as recited in claim 25, having a batch composition with a combined alkali metal and alumina content <16 mole % $Al_2O_3$+Alkali metal.

29. A glass as recited in claim 25, wherein said glass is essentially free of transition metals and has an absorption less than 30 dB/cm at 300 nm.

30. A glass as recited in claim 25, wherein said glass has an iron content less than 1 ppm by weight.

31. A glass as recited in claim 25, wherein said glass has a titanium content less than 1 ppm by weight.

32. A glass as recited in claim 25, wherein said glass has a 300 nm absorption less than 15 dB/cm.

33. A glass as recited in claim 25, wherein said glass has an absorption less than 10 dB/cm at 300 nm.

34. A glass as recited in claim 25, wherein said glass has a an absorption less than 5 dB/cm at 300 nm.

35. A glass as recited in claim 25, wherein said glass has a refractive index photosensitivity level modulated $\Delta n > 10^{-5}$ with a loaded molecular hydrogen content $\geq 10^{18} H_2$ molecules/cm$^3$.

36. A glass as recited in claim 25, wherein said glass has a refractive index photosensitivity level $\Delta n > 10^{-4}$ with a loaded molecular hydrogen content $\geq 10^{19} H_2$ molecules/cm$^3$.

37. A glass as recited in claim 25, wherein said glass is loadable with molecular hydrogen to a molecular hydrogen loaded level of at least $10^{19} H_2$ molecules/cm$^3$ with a hydrogen loading temperature $\leq 200°$ C.

38. A glass as recited in claim 25, having a molecular hydrogen content $> 10^{19} H_2$ molecules/cm$^3$ and an induced modulated refractive index $\Delta n > 10^{-4}$ by radiation having a wavelength below 300 nm.

39. A glass as recited in claim 25, having a $SiO_2$ content $\leq 65$ mole % $SiO_2$.

40. A glass as recited in claim 25, having a $SiO_2$ content $\leq 60$ mole % $SiO_2$.

41. A glass as recited in claim 25, having a $GeO_2$ content $\leq 10$ mole % $GeO_2$.

42. A glass as recited in claim 25, having a $GeO_2$ content $\leq 15$ mole % $GeO_2$.

43. A glass as recited in claim 25, having a $GeO_2$ content $\leq 20$ mole % $GeO_2$.

44. A glass as recited in claim 25, having a combined alkali metal and alumina content $\leq 13$ mole % $Al_2O_3$+Alkali metal.

45. A glass as recited in claim 25, having having a combined alkali metal and alumina content $\leq 10$ mole % $Al_2O_3$+Alkali metal.

46. A glass as recited in claim 25, having having a combined alkali metal and alumina content $\leq 5$ mole % $Al_2O_3$+Alkali metal.

47. A glass as recited in claim 25, wherein Alkali metal comprises Na.

48. A glass as recited in claim 25, wherein Alkali metal comprises Li.

49. A glass as recited in claim 25, wherein Alkali metal comprises K.

50. A glass as recited in claim 25, having a $Al_2O_3$ content $\leq 6$ mole % $Al_2O_3$.

51. A glass as recited in claim 25, having a $NaO_2$ content $\leq 6$ mole % $NaO_2$.

52. A glass as recited in claim 25, having $B_2O_3$ content $\geq 30$ mole % $B_2O_3$.

53. A glass as recited in claim 25, wherein said glass having an increased OH content when loaded with molecular hydrogen and exposed to UV radiation.

54. A glass as recited in claim 25, wherein said glass having an OH range of about 100 to 1,000 OH ppm weight.

55. A glass as recited in claim 25, wherein said glass having a chlorine content less than 10 ppm by weight.

56. A glass as recited in claim 25, wherein said glass having a melting temperature $\leq 1,600°$ C.

57. A glass as recited in claim 25, wherein said glass having a melting temperature $\leq 1,550°$ C.

58. A glass as recited in claim 25, wherein said glass is a non-sintered glass.

* * * * *